(12) United States Patent
Suzuki et al.

(10) Patent No.: US 8,582,887 B2
(45) Date of Patent: Nov. 12, 2013

(54) IMAGE PROCESSING SYSTEM, LEARNING DEVICE AND METHOD, AND PROGRAM

(75) Inventors: Hirotaka Suzuki, Tokyo (JP); Akira Nakamura, Kanagawa (JP); Takayuki Yoshigahara, Tokyo (JP); Kohtaro Sabe, Tokyo (JP); Masahiro Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 1298 days.

(21) Appl. No.: 11/813,404

(22) PCT Filed: Dec. 26, 2005

(86) PCT No.: PCT/JP2005/023747
§ 371 (c)(1),
(2), (4) Date: May 6, 2008

(87) PCT Pub. No.: WO2006/073076
PCT Pub. Date: Jul. 13, 2006

(65) Prior Publication Data
US 2009/0041340 A1 Feb. 12, 2009

(30) Foreign Application Priority Data
Jan. 7, 2005 (JP) .................................. 2005-003049

(51) Int. Cl.
*G06K 9/00* (2006.01)
(52) U.S. Cl.
USPC ........................................................ 382/181
(58) Field of Classification Search
USPC ................................ 382/155, 161; 700/47, 48
See application file for complete search history.

(56) References Cited

U.S. PATENT DOCUMENTS

| 6,072,903 A | * | 6/2000 | Maki et al. ..................... 382/190 |
| 6,094,507 A | * | 7/2000 | Monden ......................... 382/195 |

(Continued)

FOREIGN PATENT DOCUMENTS

| JP | 07-055724 | 3/1995 |
| JP | 07-078256 | 3/1995 |

(Continued)

OTHER PUBLICATIONS

M. Agarwal et al., "Indexing for local appearance-based recognition of planar objects", Pattern Recognition Letters, vol. 23, pp. 311-317 (2002).

(Continued)

*Primary Examiner* — Edward Park
(74) *Attorney, Agent, or Firm* — Finnegan, Henderson, Farabow, Garrett & Dunner, L.L.P.

(57) ABSTRACT

The present invention relates to an image processing system, a learning device and method, and a program which enable easy extraction of feature amounts to be used in a recognition process. Feature points are extracted from a learning-use model image, feature amounts are extracted based on the feature points, and the feature amounts are registered in a learning-use model dictionary registration section 23. Similarly, feature points are extracted from a learning-use input image containing a model object contained in the learning-use model image, feature amounts are extracted based on these feature points, and these feature amounts are compared with the feature amounts registered in a learning-use model registration section 23. A feature amount that has formed a pair the greatest number of times as a result of the comparison is registered in the model dictionary registration section 12 as the feature amount to be used in the recognition process. The present invention is applicable to a robot.

8 Claims, 11 Drawing Sheets

(56) References Cited

U.S. PATENT DOCUMENTS

| | | | |
|---|---|---|---|
| 6,975,755 B1 * | 12/2005 | Baumberg | 382/154 |
| 2002/0136449 A1 * | 9/2002 | Park et al. | 382/164 |
| 2005/0213818 A1 | 9/2005 | Suzuki et al. | |

FOREIGN PATENT DOCUMENTS

| | | |
|---|---|---|
| JP | 2004-326693 | 11/2004 |
| JP | 2006-065399 | 3/2006 |

OTHER PUBLICATIONS

Communication pursuant to Article 94(3) EPC from the European Patent Office, dated Apr. 13, 2010, in EP 05 819 776.5.

D. G. Lowe, "Object Recognition from Local Scale-Invariant Features", IEEE International Conference on Computer Vision, vol. 2, pp. 1150-1157, 1999.

D. G. Lowe, "Distinctive Image Features from Scale-Invariant Keypoints", International Journal of Computer Vision, vol. 60, No. 2 pp. 91-110, 2004.

K. Mikolajczyk et al., "Indexing Based on Scale Invariant Interest Points", IEEE International Conference on Computer Vision, vol. 1, pp. 525-531, 2001.

C. Schmid et al., "Local Grayvalue Invariants for Image Retrieval", IEEE Transactions on Pattern Analysis and Machine Intelligence, vol. 19, No. 5, pp. 530-535, 1997.

Office Action for Japanese Patent Application No. 2005-003049, Japanese Patent Office, Jul. 15, 2010.

European Search Report from European Patent Office dated Feb. 2, 2009, for Application No. 05819776.5-2218 /1835460 PCT/JP2005023747, 6 pages.

Schaffalitzky, F. et al., "Viewpoint Invariant Scene Retrieval using Textured Regions," Proceedings 2002 Dagstuhl Seminar on Content-based Image and Video Retrieval, 2004, pp. 11-25.

Schaffalitzky, F. et al., "Automated location matching in movies," Computer Vision and Image Understanding, Academic Press, U.S. vol. 92, No. 2-3, Nov. 1, 2003, pp. 236-264.

* cited by examiner

FIG. 6

|  | LEARNING-USE MODEL IMAGE | | |
| --- | --- | --- | --- |
|  | M1 | M2 | M3 |
| LEARNING-USE INPUT IMAGE 1 | L11 | L13 |  |
| LEARNING-USE INPUT IMAGE 2 | L22 | L24 | L24 |
| LEARNING-USE INPUT IMAGE 3 | L33 | L32 |  |
| LEARNING-USE INPUT IMAGE 4 |  |  | L43 |
| LEARNING-USE INPUT IMAGE 5 | L52 | L51 |  |

~26

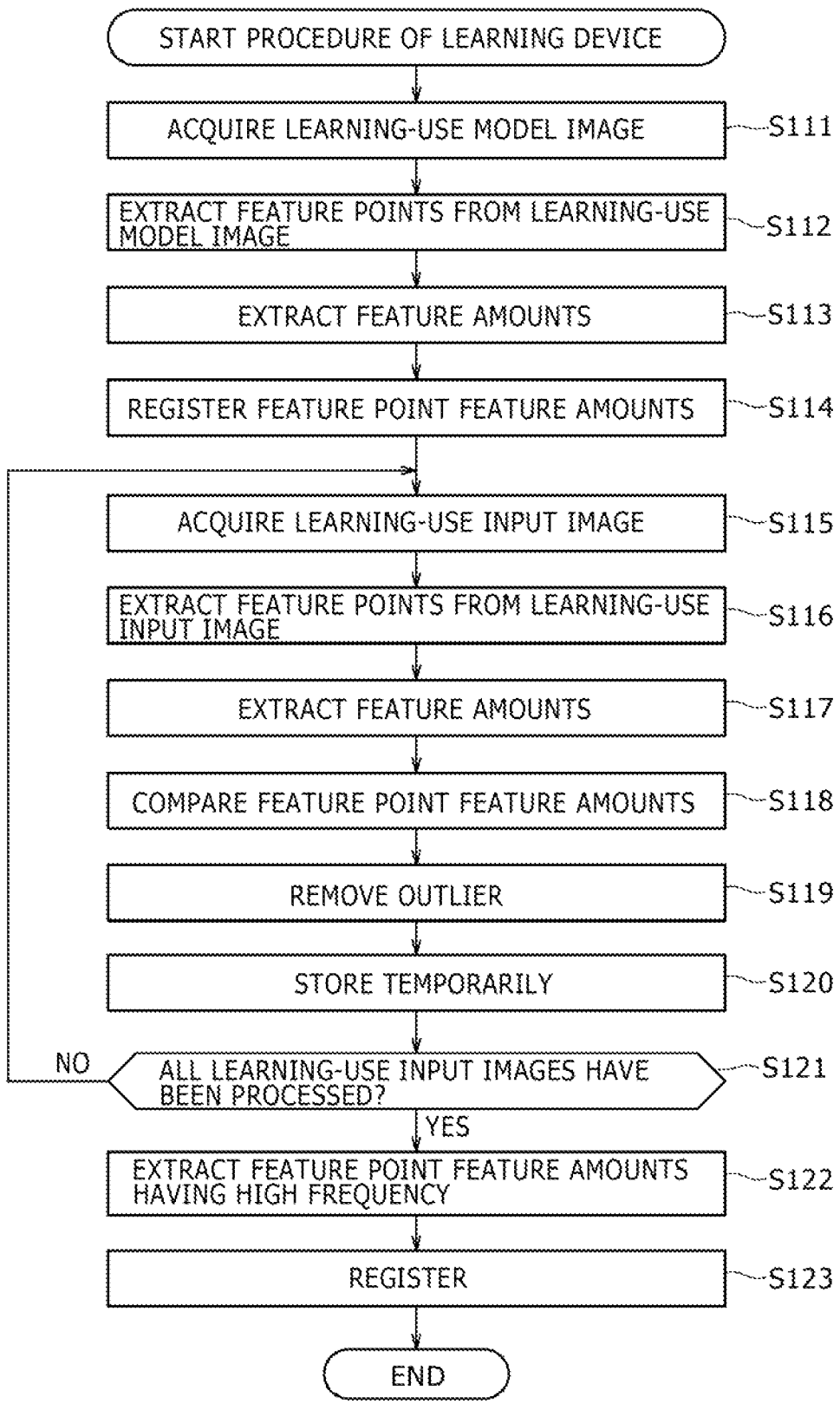

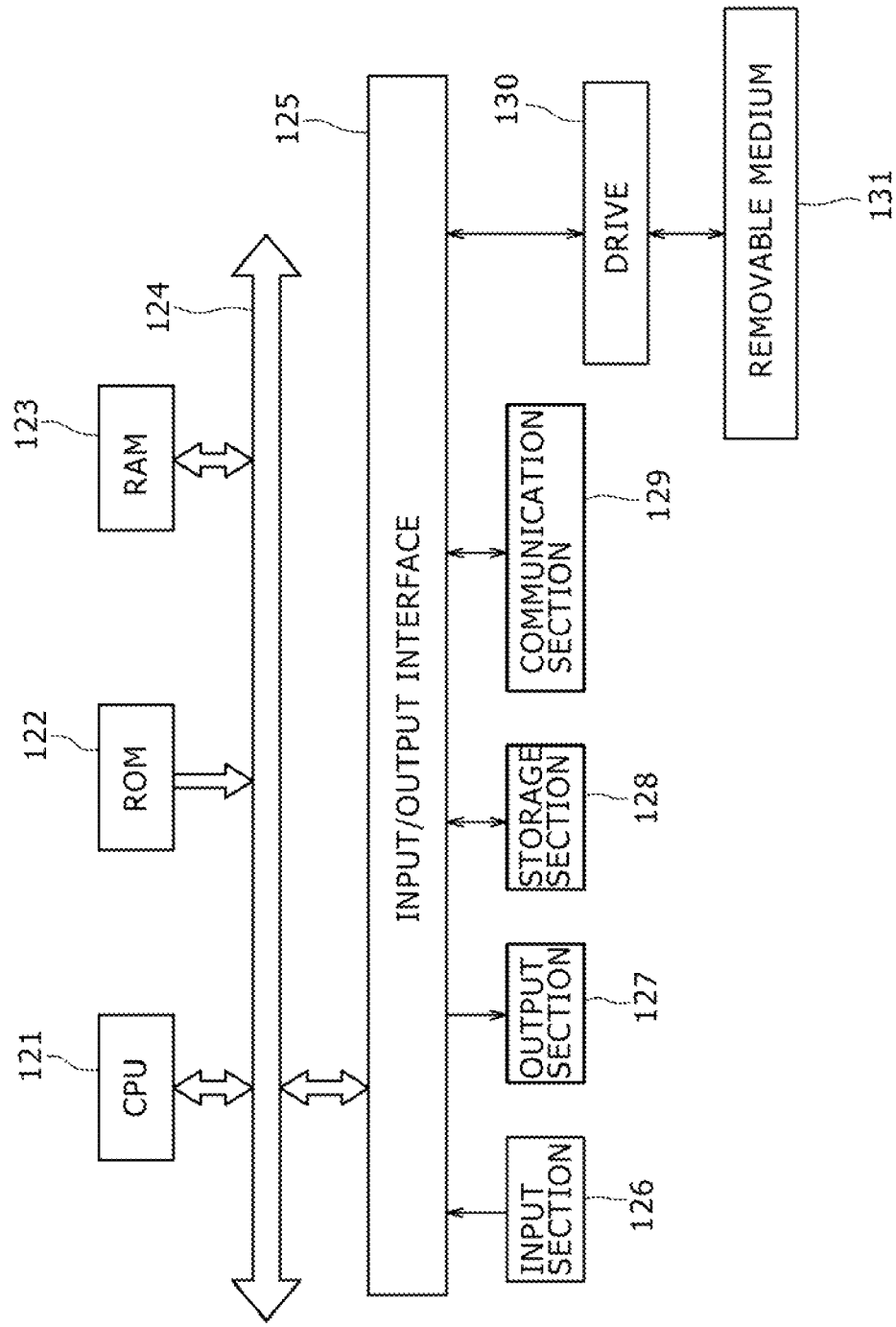

IMAGE PROCESSING SYSTEM, LEARNING DEVICE AND METHOD, AND PROGRAM

TECHNICAL FIELD

The present invention relates to an image processing system, a learning device and method, and a program, and, in particular, to an image processing system, a learning device and method, and a program which are suitably used when extracting feature point feature amounts and registering the extracted feature point feature amounts in a database in order to achieve reliable recognition of an object.

BACKGROUND ART

For example, many object recognition technologies in practical use for enabling a robot to recognize an object employs a template matching technique using a sequential similarity detection algorithm or a cross-correlation coefficient. The template matching technique is effective in a special case that permit an assumption that an object to be detected appears without deformation in an input image, but not effective in an object recognition environment of recognizing a common image with unstable viewpoint or illumination state.

On the other hand, a shape matching technique has also been proposed of matching a shape feature of the object against a shape feature of each of areas of the input image, the areas being cut out from the input image by an image dividing technique. In the aforementioned common object recognition environment, however, a result of area division will not be stable, resulting in difficulty in excellently describing the shape of an object in the input image. In particular, recognition becomes very difficult when the object to be detected is partially hidden behind another object.

Besides the above matching techniques that use an overall feature of the whole or partial areas of the input image, a technique has also been proposed of extracting characteristic points or edges from an image, expressing relative spatial positions of a collection of line segments or a collection of edges formed thereby in the form of a line diagram or a graph, and performing matching based on structural similarity between such line diagrams or graphs. Such a technique works well for a particular specialized object, but sometimes fails to extract a stable inter-feature point structure due to image deformation, resulting in difficulty in recognizing the aforementioned partially-hidden object, in particular.

As such, there has been proposed a matching technique of extracting characteristic points (i.e., feature points) from an image and using feature amounts obtained from image information of the feature points and local neighborhoods thereof. In this matching technique that uses local feature amounts of the feature points which remain unchanged regardless of partial image deformation, more stable detection is achieved than by the above-described techniques even when image deformation occurs or the object to be detected is partially hidden. Examples of already proposed methods for extracting feature points that remain unchanged regardless of scale transformation include: a method of constructing a scale space of an image, and extracting, from local maximum points and local minimum points of a "Difference of Gaussian (DoG) filter output" of the image at each scale, a point whose position is not changed by a change in a scale direction as a scale feature point (Non-Patent Document 1 or Non-Patent Document 2); and a method of constructing the scale space of an image, and extracting, from corner points extracted by a Harris corner detector from the image at each scale, a point that gives a local maximum of a "Laplacian of Gaussian (LoG) filter output" of a scale space image as the feature point (Non-Patent Document 3).

Moreover, it is preferable that, in the feature points extracted in the above-described manner, a feature amount invariant to a line-of-sight change be selected. For example, Schmid & Mohr has proposed a matching technique of determining a corner detected by means of the Harris corner detector to be the feature point, and using a rotation-invariant feature amount of a neighborhood of the feature point for matching (Non-Patent Document 4).

[Non-Patent Document 1]
D. Lowe, "Object recognition from local scale-invariant features, in Proc. International Conference on Computer Vision, Vol. 2, pp. 1150-1157, Sep. 20-25, 1999, Corfu, Greece.

[Non-Patent Document 2]
D. Lowe, "Distinctive image features from scale-invariant keypoints, accepted for publication in the International Journal of Computer Vision, 2004. K. Mikolajczyk, C. Schmid, Indexing based on scale invariant interest points, International Conference on Computer Vision, 525-531, July 2001.

[Non-Patent Document 3]
K. Mikolajczyk, C. Schmid, "Indexing based on scale invariant interest points, International Conference on Computer Vision, 525-531, July 2001. Schmid, C., and R. Mohr, Local grayvalue invariants for image retrieval, IEEE PAMI, 19, 5, 1997, pp. 530-534.

[Non-Patent Document 4]
Schmid, C., and R. Mohr, "Local grayvalue invariants for image retrieval, IEEE PAMI, 19, 5, 1997, pp. 530-534.

DISCLOSURE OF INVENTION

Problems to be Solved by Invention

As described above, an increasingly prevalent technique in the field of object recognition is a method of: extracting the characteristic points (i.e., the feature points) from each of an image (i.e., a model image) of an object to be recognized and an image (i.e., an input image) from which the object to be recognized should be detected; extracting from each feature point the feature amount (hereinafter referred to as a "feature point feature amount" or a "feature amount" as appropriate) in the feature point; estimating the degree of similarity between a collection of feature amounts of the model image and a collection of feature amounts of the input image (i.e., matching between the model image and the input image); extracting a collection of corresponding feature points; and detecting a model object in the input image based on analysis of the collection of corresponding feature points.

This technique, however, involves a tradeoff in that as the number of feature points with respect to which the degree-of-similarity comparison is performed (the actual object of comparison is the feature amounts extracted from the feature points, and since in some cases a plurality of feature amounts are extracted from one feature point, the number of feature points may not correspond to the number of feature amounts with respect to which the degree-of-similarity comparison is performed, but to facilitate explanation, it is herein mentioned as "the number of feature points" or "the number of feature point feature amounts") increases, the accuracy of recognition may improve but a time required for recognition will increase.

That is, adjustment (a process of increasing or decreasing) of the number of feature points is required to improve recognition performance. At present, the adjustment of the number of feature points is generally performed by adjusting a parameter for feature point extraction.

Because a proper parameter varies depending on a characteristic of the object to be recognized (whether it is a common object, an object belonging to a specific category, or a human face) and a recognition environment (outdoors or indoors, a camera resolution, etc.), it is at present necessary to find the proper parameter by human labor empirically. Thus, the adjustment of the number of feature points for improving the accuracy of recognition unfavorably requires the human labor (effort) and time.

The present invention has been devised in view of the above situation, and aims to enable easy setting of an optimum parameter.

Means for Solving the Problems

An image processing system according to the present invention includes: first feature point extraction means for extracting first feature points from a first image; first feature amount extraction means for extracting first feature amounts from the first feature points extracted by the first feature point extraction means; first registration means for registering the first feature amounts extracted by the first feature amount extraction means; second feature point extraction means for extracting second feature points from a second image; second feature amount extraction means for extracting second feature amounts from the second feature points extracted by the second feature point extraction means; generation means for comparing the first feature amounts registered by the first registration means with the second feature amounts extracted by the second feature amount extraction means to generate candidate corresponding feature point pairs as pairs of feature points that have similar feature amounts; selection means for selecting, from the first feature amounts, registration-use feature amounts to be registered, based on a frequency with which each of the first feature amounts is included in the candidate cocorresponding feature point pairs generated by the generation means; second registration means for registering the registration-use feature amounts selected by the selection means; third feature point extraction means for extracting third feature points from a third image; third feature amount extraction means for extracting third feature amounts from the third feature points extracted by the third feature point extraction means; and detection means for comparing the registration-use feature amounts registered by the second registration means with the third feature amounts extracted by the third feature amount extraction means to detect a model object contained in the third image.

A learning device according to the present invention includes: first feature point extraction means for extracting first feature points from a first image; first feature amount extraction means for extracting first feature amounts from the first feature points extracted by the first feature point extraction means; first registration means for registering the first feature amounts extracted by the first feature amount extraction means; second feature point extraction means for extracting second feature points from a second image; second feature amount extraction means for extracting second feature amounts from the second feature points extracted by the second feature point extraction means; generation means for comparing the first feature amounts registered by the first registration means with the second feature amounts extracted by the second feature amount extraction means to generate candidate corresponding feature point pairs as pairs of feature points that have similar feature amounts; and selection means for selecting, from the first feature amounts, a registration-use feature amount to be registered, based on a frequency with which each of the first feature amounts is included in the candidate cocorresponding feature point pairs generated by the generation means.

The second image may contain a model image contained in the first image without fail.

A parameter used when the first feature point extraction means and the first feature point extraction means perform the extraction may be set at a void value.

The second image may be an image generated by subjecting a specified image to digital processing.

The digital processing may be one of scale transformation, rotational transformation, similarity transformation, affine transformation, projection transformation, noise addition, brightness change, sharpness change, and blur addition, or any combination of these image transforms.

A learning method according to the present invention includes: a first feature point extraction step of extracting first feature points from a first image; a first feature amount extraction step of extracting first feature amounts from the first feature points extracted in the first feature point extraction step; a first registration step of registering first feature amounts extracted in the first feature amount extraction step; a second feature point extraction step of extracting second feature points from a second image; a second feature amount extraction step of extracting second feature amounts from the second feature points extracted in the second feature point extraction step; a generation step of comparing the first feature amounts registered in the first registration step with the second feature amounts extracted in the second feature amount extraction step to generate candidate corresponding feature point pairs as pairs of feature points that have similar feature amounts; and a selection step of selecting, from the first feature amounts, a registration-use feature amount to be registered, based on a frequency with which each of the first feature amounts is included in the candidate cocorresponding feature point pairs generated in the generation step.

A program according to the present invention includes: a first feature point extraction step of extracting first feature points from a first image; a first feature amount extraction step of extracting first feature amounts from the first feature points extracted in the first feature point extraction step; a first registration step of registering first feature amounts extracted in the first feature amount extraction step; a second feature point extraction step of extracting second feature points from a second image; a second feature amount extraction step of extracting second feature amounts from the second feature points extracted in the second feature point extraction step; a generation step of comparing the first feature amounts registered in the first registration step with the second feature amounts extracted in the second feature amount extraction step to generate candidate corresponding feature point pairs as pairs of feature points that have similar feature amounts; and a selection step of selecting, from the first feature amounts, a registration-use feature amount to be registered, based on a frequency with which each of the first feature amounts is included in the candidate cocorresponding feature point pairs generated in the generation step.

In the learning device and method and the program according to the present invention, feature amounts are extracted from an image used for learning and registered, and the registered feature amounts are compared with feature amounts extracted from an image prepared also as an image used for learning. A result of this comparison is used to set feature amounts used in an actual recognition process.

In the image processing system according to the present invention, further, the recognition process is performed by using the feature amounts set in the above-described manner for matching with an acquired image to detect a model object contained in the acquired image.

Effect of Invention

The present invention achieves the extraction of the feature points (i.e., the feature amounts).

The present invention achieves selective extraction of feature point feature amounts optimum for recognition, without the need for a person to empirically set a parameter for the extraction of the feature points.

The present invention achieves setting of the number of feature points (the number of feature amounts) optimum for improving recognition accuracy and reducing a time required for the recognition process. In other words, while the reduction in the number of feature points is achieved, improvement in recognition speed is achieved.

The present invention achieves selective extraction of only those feature points (feature amounts) that have a high degree of contribution to realization of excellent recognition performance. Further, using these selectively-extracted feature points (feature amounts) for the recognition process achieves improvement in the recognition speed and recognition accuracy.

The present invention achieves selection of only those feature points that are capable of realizing robust recognition in recognition environments that are assumed when preparing a collection of model learning-use images, and achieves improvement in the recognition speed and recognition accuracy by using these feature points in the recognition process.

BRIEF DESCRIPTION OF THE DRAWINGS

FIG. 6 is a diagram for explaining data relating to the extraction.
FIG. 10 is a flowchart for explaining another operation of the learning device.
FIG. 11 is a diagram for explaining a medium.

DESCRIPTION OF REFERENCE SYMBOLS 11 learning device,
12 model dictionary registration section,
13 recognition device,
21 feature point extraction section,
22 feature amount extraction section,
23 learning-use model dictionary registration section,
24 feature point extraction section,
25 feature amount extraction section,
26 feature amount comparison section,
27 model dictionary registration processing section,
31 feature point extraction section,
32 feature amount extraction section,
33 feature amount comparison section,
34 model detection determination section,
101 learning device,
111 outline removal section

BEST MODE FOR CARRYING OUT THE INVENTION

Hereinafter, embodiments of the present invention will be described with reference to the accompanying drawings.

[Exemplary System Configuration]

Figure 1:
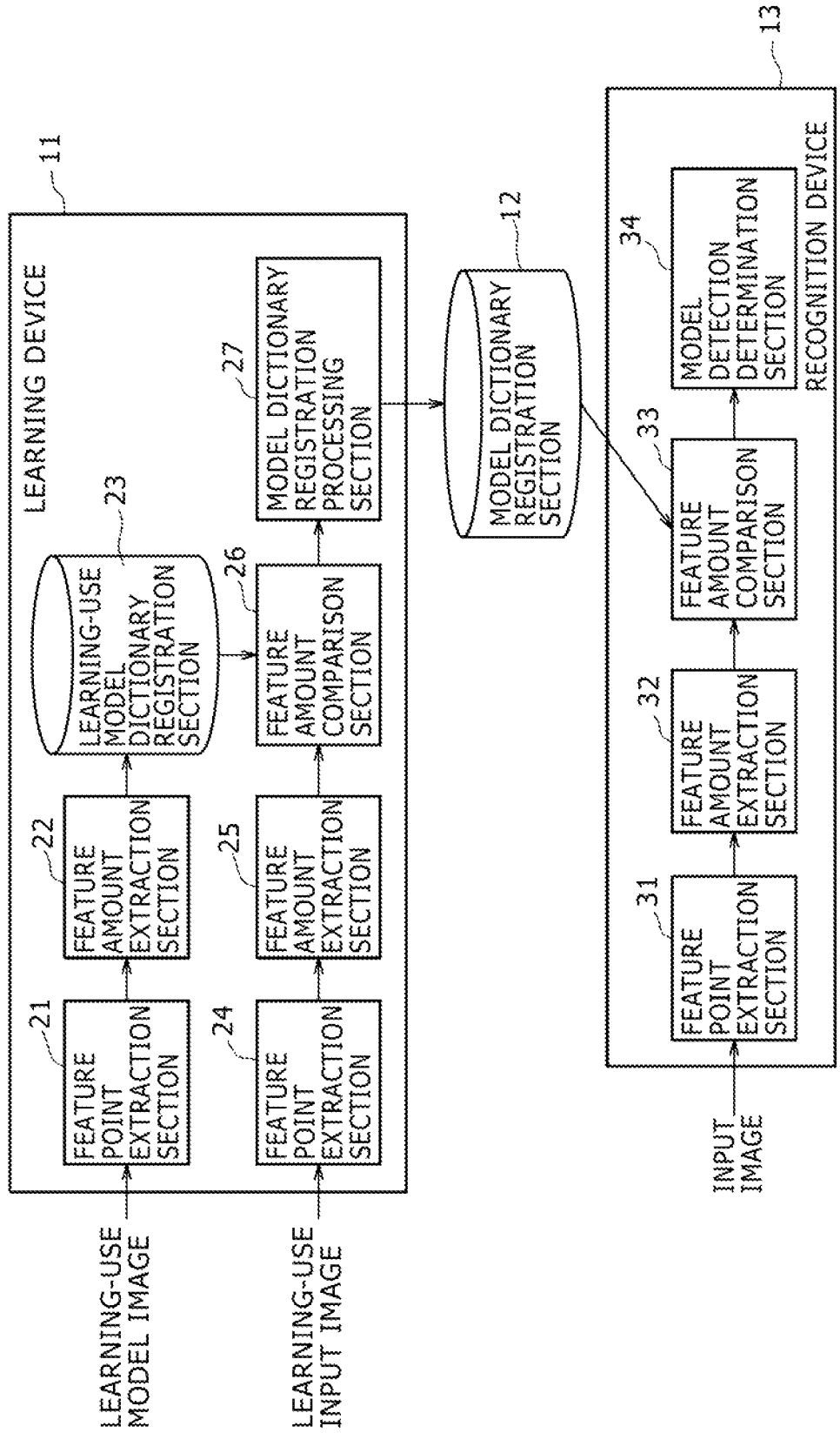
FIG. 1 is a diagram illustrating a configuration of a system according to one embodiment of the present invention.

FIG. 1 is a diagram illustrating a configuration of a system according to one embodiment of the present invention. This system is composed of three parts: a learning device 11 for performing a process of learning feature points (i.e., feature point feature amounts); a model dictionary registration section 12 for storing the feature point feature amounts, i.e., results of learning by the learning device 11; and a recognition section 13 for recognizing a model object within an input image.

The learning section 11 is composed of a feature point extraction section 21, a feature amount extraction section 22, a learning-use model dictionary registration section 23, a feature point extraction section 24, a feature amount extraction section 25, a feature amount comparison section 26, and a model dictionary registration processing section 27.

The feature point extraction section 21 extracts feature points from a learning-use model image which is inputted. The feature amount extraction section 22 extracts a feature amount of each of the feature points extracted by the feature point extraction section 22. The learning-use model dictionary registration section 23 registers (i.e., stores) a collection of feature amounts of the model image extracted by the feature amount extraction section 22.

The feature point extraction section 24 extracts feature points from a learning-use input image which is inputted. The feature amount extraction section 25 extracts a feature amount of each of the feature points extracted by the feature point extraction section 24. Processes performed by the feature point extraction section 24 and the feature amount extraction section 25 are similar to those performed by the feature point extraction section 21 and the feature amount extraction section 22, which process the learning-use model image.

The feature amount comparison section 26 compares the feature amounts extracted by the feature amount extraction section 25 with the collection of feature amounts of the model image to be recognized. The model dictionary registration processing section 27 extracts feature point feature amounts to be registered in the model dictionary registration section 12, and supplies them to the model dictionary registration section 12.

Note that only one learning-use model image is prepared for each object to be learned. Only a collection of seed feature amounts (which will be described below) extracted from the single learning-use model image of the object to be learned is held in the learning-use model dictionary registration section 23, and the feature amount comparison section 26 of the learning device 11 performs matching of the collection of seed feature amounts with the collection of feature amounts of the learning-use input image.

In the model dictionary registration section 12, a result of the above-described learning in the learning device 11 (in this case, the collection of feature amounts concerning the model image, which will be referred to when the recognition device 13 performs recognition) is registered.

While the collection of feature amounts extracted from the learning-use model image is registered in both of the learning-use model dictionary registration section 23 and the model dictionary registration section 12, the collection of feature amounts registered in the model dictionary registration section 12 is one obtained after learning, and is optimum data to be used when the recognition device 13 performs a recognition process.

The recognition device 13 that performs the recognition process using the collection of feature amounts registered in the model dictionary registration section 12 is composed of a feature point extraction section 31, a feature amount extraction section 32, a feature amount comparison section 33, and a model detection determination section 34.

Processes performed by the feature point extraction section 31, the feature amount extraction section 32, and the feature amount comparison section 33 of the recognition device 13 are basically similar to those performed by the feature point extraction section 24, the feature amount extraction section 25, and the feature amount comparison section 26 of the learning device 11.

In the case where a plurality of objects should be recognized, the learning device 11 selects and extracts the feature point feature amounts with respect to each of the objects, and registers them in the model dictionary registration section 12. That is, the model dictionary registration section 12 holds collections of model feature amounts with respect to all objects to be recognized, and the feature amount comparison section 33 of the recognition device 13 is configured to perform matching of the collections of feature amounts of all the objects to be recognized with the collection of feature amounts of the input image. Therefore, the feature amount comparison section 26 and the feature amount comparison section 33 may handle different data while sharing the same algorithm.

Naturally, values of parameters used in the processes performed at the respective sections may be different between sections, as appropriate. The model detection determination section 34 detects the model object contained in the input image using data supplied from the feature amount comparison section 33.

Note that units (e.g., the feature point extraction section 21 and the feature point extraction section 24) of the learning device 11 that perform an identical process may be configured as a single unit that can be used in common, instead of being provided separately. Also note that the learning device 11 may include the model dictionary registration section 12, and that, in the case where the learning device 11 includes the model dictionary registration section 12, it may be so arranged that the model dictionary registration section 12 be integrated with the learning-use model dictionary registration section 23 (or registrations in the learning-use model dictionary registration section 23 be updated).

Alternatively, the recognition device 13 may include the model dictionary registration section 12.

The learning device 11, the model dictionary learning section 12, and the recognition device 13 are connected to one another via a network to allow data exchange therebetween (at least, the learning device 11 and the model dictionary registration section 12, and the model dictionary registration section 12 and the recognition device 13, can exchange data with each other). The network may be either a wired network or a wireless network.

[On Operation of Learning Device]

Figure 2:
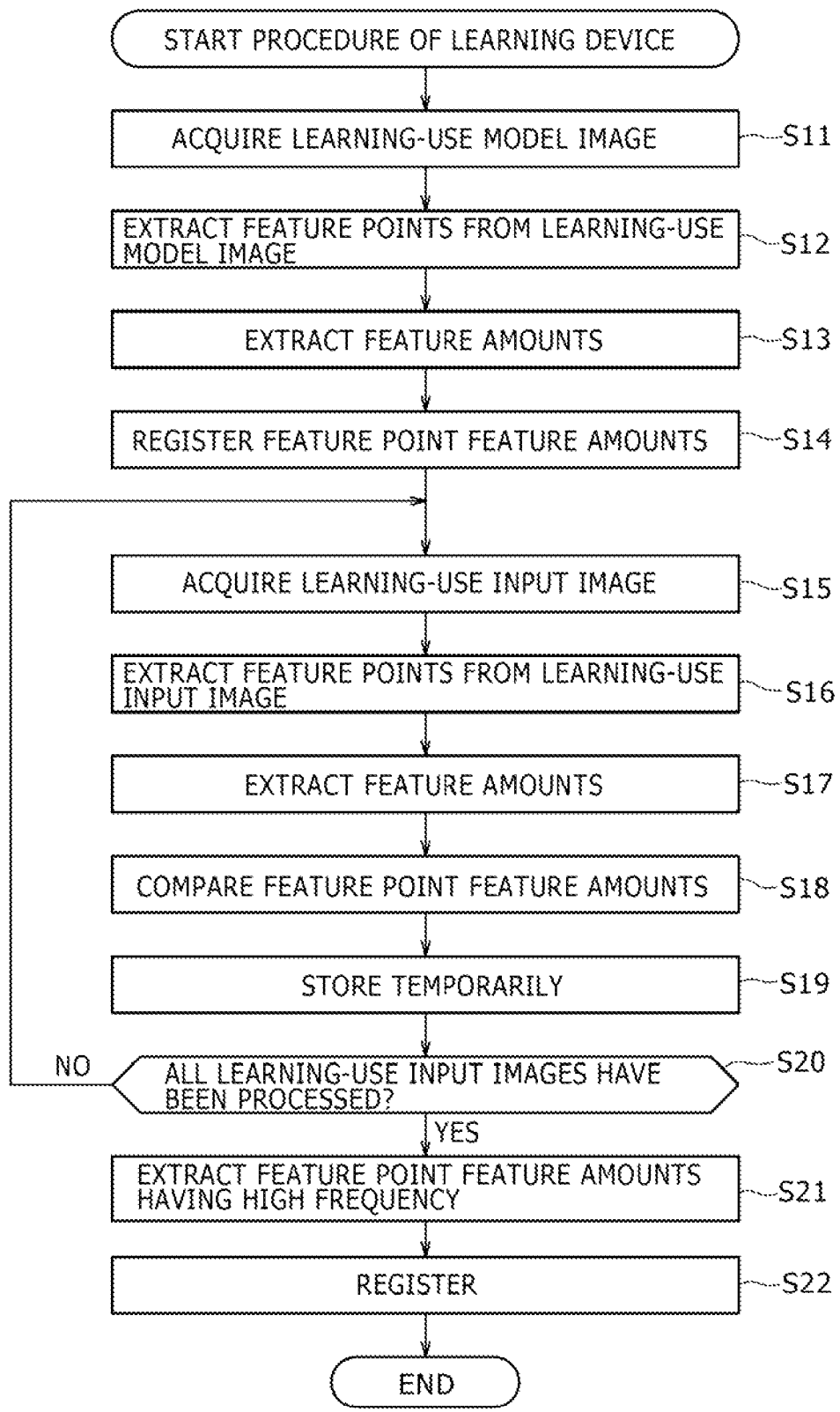
FIG. 2 is a flowchart for explaining an operation of a learning device.

Next, referring to a flowchart of FIG. 2, an operation of the learning device 11 included in the system as illustrated in FIG. 1 will now be described below. A procedure that will be described with reference to the flowchart of FIG. 2 is a procedure performed when the collection of feature amounts of the learning-use model image is registered.

At step S11, the feature point extraction section 21 of the learning device 11 acquires the learning-use model image. The learning-use model image is a photographed image of the object (i.e., the model object) to be recognized.

In the learning device 11, only one learning-use model image as photographed is prepared for each object to be learned. From this single learning-use model image, the collection of seed Feature amounts is extracted. Therefore, it is preferable that the learning-use model image is one prepared in an as ideal photographing environment as possible. On the other hand, multiple images photographed from various viewpoints are prepared as learning-use input images described below. Alternatively, multiple images generated from the learning-use model image by digital processing may be prepared.

After the learning-use model image is acquired at step S11, the feature point extraction section 21 extracts the feature points from the learning-use model image at step S12. For the process performed by the feature point extraction section 21 (i.e., a technique for extracting the feature points), various techniques have been proposed, such as a Harris corner detector (C. Harris and M. Stephens, A combined corner and edge detector", Fourth Alvey Vision Conference, pp. 147-151, 1988.), a SUSAN corner detector (S. M. Smith and J. M. Brady. SUSAN—a new approach to low level image processing), and a KLT feature point (Carlo Tomasi and Takeo Kanade. Detection and Tracking of Point Features. Carnegie Mellon University Technical Report CMU-CS-91-132, April 1991), and such techniques can be applied.

Moreover, besides the aforementioned techniques, a technique has been proposed of generating from the original image (in this case, the learning-use model image) a collection of images in a plurality of layers with different resolutions or at different scales, and extracting, from the collection of images, feature points that are invariant to rotational transformation or scale transformation, and this technique is applicable as the technique relating to the extraction of the feature points performed by the feature point extraction section 21 (see D. Lowe, "Distinctive image features from scale-invariant keypoints, accepted for publication in the International Journal of Computer Vision, 2004. K. Mikolajczyk, C. Schmid, 的 ndexing based on scale invariant interest points, International Conference on Computer Vision, 525-531, July 2001., K. Mikolajczyk, C. Schmid, "Indexing based on scale invariant interest points," International Conference on Computer Vision, 525-531, July 2001. Schmid, C., and R. Mohr, "Local grayvalue invariants for image retrieval," IEEE PAMI, 19, 5, 1997, pp. 530-534.).

[On Extraction of Feature Points]

Figure 3:
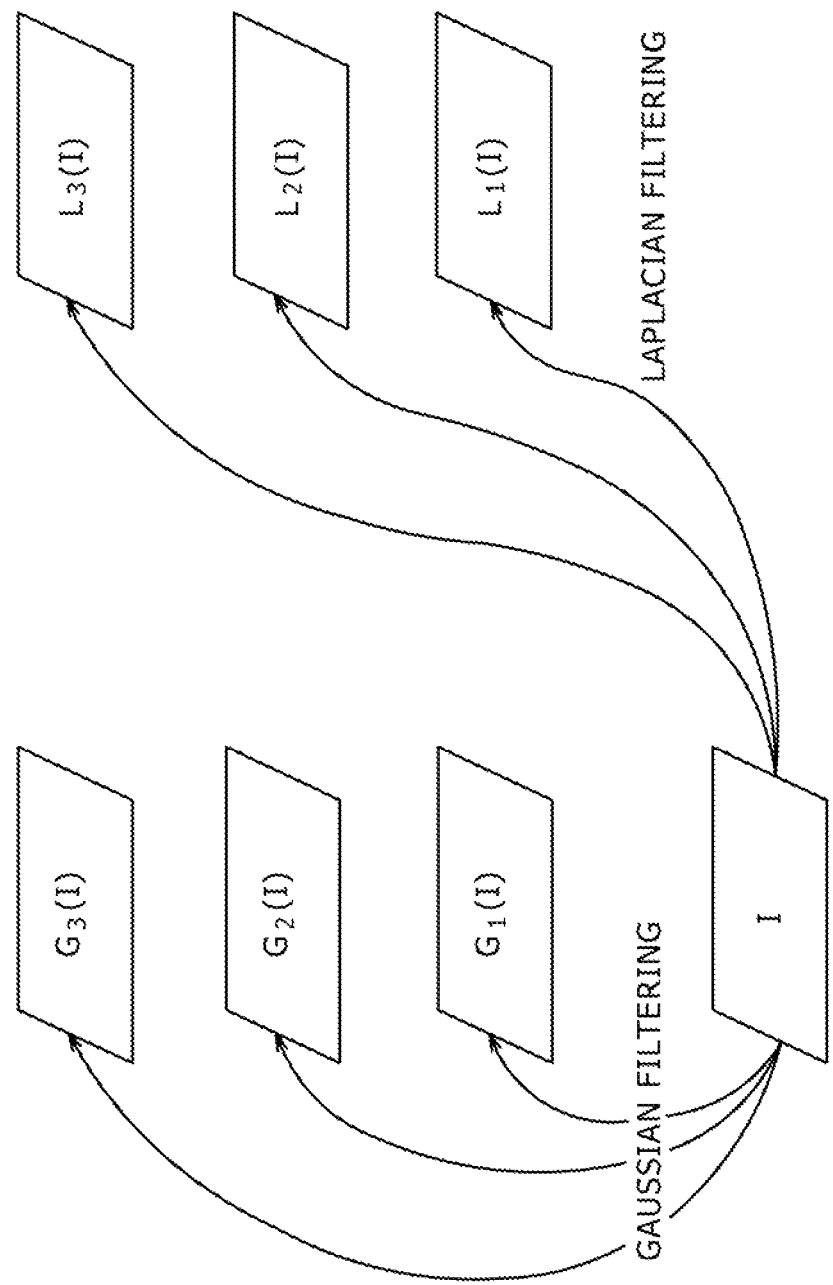
FIG. 3 is a diagram for explaining extraction of feature points.

Here, referring to FIG. 3, a brief description of a Harris-Laplacian feature point extraction technique using the Harris corner detector will now be provided below (for the details, see K. Mikolajczyk, C. Schmid, 的 ndexing based on scale invariant interest points, International Conference on Computer Vision, 525-531, July 2001.).

In the Harris-Laplacian feature point extraction technique, an image I is subjected to Gaussian filtering to generate an image $G_1$ (I). The image $G_1$ (I) is an image with a coarser resolution different from that of the image I. Images with coarser resolutions can be generated by increasing a parameter σ that determines the shape of a Gaussian filter.

The image I is subjected to Gaussian filtering that produces an image with a coarser resolution than that of the image $G_1$ (I) (i.e., filtering by use of a Gaussian filter with a greater value of σ) to generate an image $G_2$ (I). Similarly, the image I is subjected to Gaussian filtering that produces an image with a coarser resolution than those of the image $G_1$ (I) and the image $G_2$ (I) (i.e., filtering by use of a Gaussian filter with a still greater value of σ) to generate an image $G_3$ (I). Thus, the image I, the image $G_1$ (I), the image $G_2$ (I), and the image $G_3$ (I) each with a different resolution are generated (note that the number of images generated is variable appropriately).

In each of the image I, the image $G_1$ (I), the image $G_2$ (I), and the image $G_3$ (I) (at different scales), candidates for the feature points are extracted by the corner detector. In this extraction, out of maximum points in terms of a Harris corner degree (i.e., points (pixels) that each have the maximum value among immediate neighbors (e.g., nine pixels)), points that have a Harris corner degree equal to or greater than a prescribed threshold value (which will be referred to as a "first threshold value" herein) are extracted as the candidates for the feature points.

After such candidates for the feature points are extracted, images that correspond to the image I, the image $G_1$ (I), the image $G_2$ (I), and the image $G_3$ (I) and which are obtained by Laplacian filtering are generated. A greater parameter σ that determines the shape of a Laplacian filter will result in a Laplacian filter output image with a coarser resolution. Specifically, in this case, first, the image I is subjected to the Laplacian filtering to generate an image $L_1$ (I).

Next, the image I is subjected to filtering using a Laplacian filter having a greater value of σ than that of the Laplacian filter used when the image $L_1$ (I) has been generated to generate an image $L_2$ (I). Further, the image I is subjected to filtering using a Laplacian filter having a still greater value of σ to generate an image $L_3$ (I). The feature points will be extracted using the image $L_1$ (I), the image $L_2$ (I), and the image $L_3$ (I). This extraction will be described with reference to FIG. 4.

Figure 4:
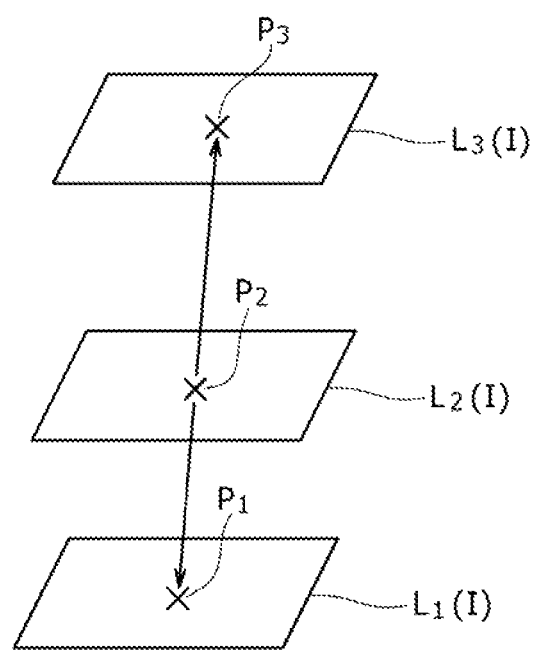
FIG. 4 is a diagram for explaining the extraction of the feature points.

In FIG. 4, a candidate for a feature point extracted from the image $G_1$ (I) corresponding to the image $L_1$ (I) is denoted as a point $P_1$; a candidate for a feature point extracted from the image $G_2$ (I) corresponding to the image $L_2$ (I) is denoted as a point $P_2$; and a candidate for a feature point extracted from the image $G_3$ (I) corresponding to the image $L_3$ (I) is denoted as a point $P_3$. In this case, the point $P_1$ in the image $L_1$ (I) exists at a position corresponding to that of the point $P_2$ in the image $L_2$ (I), and the point $P_3$ in the image $L_3$ (I) exists at a position corresponding to that of the point $P_2$ in the image $L_2$ (I).

Out of the candidates for the feature points, a point that satisfies the following conditions is extracted as the feature point. Here, the conditions will be described with reference to an exemplary case where the point $P_2$ is the candidate for the feature point. A first condition is that the point $P_2$ is equal to or greater than a predetermined threshold value (here, the second threshold value): point $P_2 \geq$ second threshold value.

A second condition is that the point $P_2$ is greater than corresponding points (in this case, the point $P_1$ and the point $P_3$) in images at an immediately higher scale and at an immediately lower scale: point $P_2 \geq$ point $P_1$, and $P_2 \geq$ point $P_3$.

When the first condition and the second condition are satisfied, the candidate for the feature point is extracted as the feature point.

In the above-described manner, the plurality of feature points are extracted from the learning-use model image at step S12 (FIG. 2).

While the Harris-Laplacian feature point extraction technique has been described as one technique for extracting the feature points, other techniques can naturally be applied. Even when another technique is applied to extract the feature points, the following can be said about the extraction of the feature points: some threshold value (parameter) is used to extract the feature points.

In the above-described Harris-Laplacian feature point extraction technique, the first threshold value is used when extracting the candidates for the feature points from the pixels of the images obtained by the Gaussian filtering, whereas the second threshold value is used when extracting the feature points from the candidates for the feature points in the images obtained by the Laplacian filtering. Thus, some threshold value (parameter) is used in some manner when extracting the feature points. The fact that some parameter is used when extracting the feature points is also true with other techniques than the Harris-Laplacian feature point extraction technique.

An optimum value of the parameter varies depending on a characteristic (whether the object is a common object, an object belonging to a specific category, or a human face) of the object to be recognized (in this case, the learning-use model image) and a recognition environment (outdoors or indoors, a camera resolution, etc.). At present, the optimum parameter need be found empirically by human labor for setting the optimum parameter.

The human labor is required to adjust the parameter partly because recognition performance obtained as a result of the adjustment of the parameter is not estimated inside the system not to gain feedback for the adjustment of the parameter, and thus, at present, a person outside the system gives the feedback empirically. Moreover, there is a problem in that since the adjustment of the parameter has only indirect influence on a result of recognition, desired improvement in the recognition performance is not necessarily achieved by adjusting the number of feature points by manipulation of the parameter.

That is, there is a problem in that it takes time and labor to extract an optimum number of feature points, and there is also a problem in that the time and labor do not always ensure improvement in the recognition performance. The present invention solves such problems by extracting (setting) the feature points (i.e., the feature point feature amounts) by performing the following processes.

Returning to the description of the flowchart of FIG. 2, after the feature points are extracted from the learning-use model image by the feature point extraction section 21 at step S12, control proceeds to step S13. At step S13, the feature amount extraction section 22 calculates the feature amounts concerning the feature points extracted by the feature point extraction section 21. With respect to each of the plurality of feature points extracted by the feature point extraction section 21, the feature amount extraction section 22 calculates the feature amount based on image information of a neighborhood of the feature point.

For the calculation of the feature amount, already proposed techniques can be applied, such as gray patch (in which brightness values of neighboring pixels are arranged to make feature amount vectors), gradient vector, Gabor jet, steerable jet, etc. A technique of calculating a plurality of feature amounts of the same type with respect to one feature point may be applied. A plurality of feature amounts of different types may be calculated with respect to each feature amount. No particular limitations need be placed on the technique for the calculation of the feature amounts by the feature amount extraction section 22. The present invention can be applied to any technique applied.

After the feature amounts are calculated at step S13, the calculated feature amounts are registered in the learning-use model dictionary registration section 23 at step S14. Herein, the feature amounts registered in the learning-use model dictionary registration section 23 will be referred to as a "collection of seed feature point feature amounts".

The collection of seed feature point feature amounts is feature amounts that are registered in a learning stage for setting optimum feature points (feature amounts). For the extraction of the collection of seed feature point feature amounts, which is such a type of feature amounts, addition of the following conditions to the processes by the feature point extraction section 21 and the feature amount extraction section 22 is desirable.

Regarding the feature point extraction section 21, the value of the parameter used in the process of extracting the feature points is set in such a manner that as many feature points as possible will be extracted. Specifically, in the case where the extraction of the feature points is performed according to the Harris-Laplacian feature point extraction technique described in the [On extraction of feature points] section, the first threshold value and the second threshold value are set such that as many feature points as possible will be extracted.

Specifically, when the second threshold value, which is a threshold value used when the process of extracting the feature points from the candidates for the feature points is performed, is set at 0 (void), all candidates satisfy at least the above-described first condition that, of the candidates for the feature points, any candidate that is equal to or greater than the second threshold value is determined to be the feature point, and as a result, many feature points will be extracted as the candidates.

The collection of seed feature point feature amounts having the above characteristic is registered in the learning-use model dictionary registration section 23.

If the collection of seed feature point feature amounts were used for the recognition process, the recognition would take a long time because the number of feature points is many for the above-described reason. Moreover, although the number of feature points is many, these feature points are, as described above, simply a result of setting such a parameter as to result in the extraction of many feature points, and not a result of setting such a parameter as to result in the extraction of the optimum feature points. Therefore, these feature points do not necessarily contribute to improvement in accuracy of recognition.

As such, in the present embodiment, the following processes (a learning procedure) are performed to optimize the collection of seed feature point feature amounts and reduce the number of feature points so that only optimum feature points (collection of feature point feature amounts) for the recognition process will be extracted.

Returning to the description of the flowchart of FIG. 2, after the collection of seed feature point feature amounts concerning the learning-use model image is registered in the learning-use model dictionary registration section 23 at step S14, the feature point extraction section 24 acquires the learning-use input image at step S15. This learning-use input image is one of a plurality of images of the object (i.e., the model object) to be learned, as photographed from a variety of angles or in different situations in terms of brightness. The plurality of such images may be photographed beforehand. Alternatively, the learning-use model image acquired at step S11 may be subjected to a variety of digital processing to prepare such images.

Examples of the digital processing applied when the digital processing is used include the scale transformation, the rotational transformation, similarity transformation, affine transformation, projection transformation, noise addition, brightness change, sharpness increase, blur addition, etc., and combinations of such image transforms, which are used to simulatively realize, by digital image processing, image variations resultant from variation of a general photographing environment and a photographing position.

In the learning device 11, only one learning-use model image as photographed is prepared for each object to be learned. That is, there is only one learning-use model image. On the other hand, as the learning-use input images being mentioned here, multiple images photographed from various viewpoints or multiple images generated by the digital processing are prepared.

Each learning-use input image contains the model object of the learning-use model image without fail.

At step S16, the feature point extraction section 24 extracts the feature points from the acquired learning-use input image. At step S17, the feature amount extraction section 25 calculates the feature amount based on image information of a neighborhood of each feature point extracted by the feature point extraction section 24. Processes performed at step S16 and step S17 (i.e., the processes performed by the feature point extraction section 24 and the feature amount extraction section 25) are basically the same as the processes performed at step S12 and step S13 (i.e., the processes performed by the feature point extraction section 21 and the feature amount extraction section 22), and therefore, descriptions thereof are omitted.

The feature amounts thus calculated are supplied to the feature amount comparison section 26. At step S11, the feature amount comparison section 26 compares the supplied feature amounts against the collection of seed feature point feature amounts which is registered in the learning-use model dictionary registration section 23 and which has been extracted from the learning-use model image, which is the current object to be learned. Specifically, in accordance with an inter-feature amount matching operation according to a predetermined object recognition technique, the feature amount comparison section 26 calculates the degree of similarity between the extracted feature point feature amounts and the collection of seed feature point feature amounts registered in the learning-use model dictionary registration section 23 to associate feature point feature amounts with a high degree of similarity therebetween with each other. As a result of this process, a collection of pairs of feature points associated with each other is generated.

When the learning-use input image contains the model object, a large number of feature amounts associated with the model will be detected. As described above, it is assumed in this case that the learning-use input image contains the model object. Therefore, supposing that results of this matching of the learning-use model image with all the learning-use input images are aggregated and, based on a result of the aggregation, a frequency F (Mi) with which each feature point feature amount Mi of the learning-use model image is used for recognition as a member of a collection of pairs of corresponding feature points is calculated, feature point feature amounts having higher values of this frequency can be regarded as feature point feature amounts that have higher degrees of contribution to realization of excellent recognition performance.

Thus, out of the feature point feature amounts of the learning-use model image, only feature point feature amounts having a high value of the frequency F (Mi) are selectively extracted and registered in the model dictionary registration section 12 as the collection of feature point feature amounts of the model object.

In order for only the (collection of) feature point feature amounts with a high degree of contribution to be registered in the model dictionary registration section 12 in the model dictionary registration section 12 as described above, the matching of the learning-use model image with the plurality of learning-use input images is carried out first so that a plurality of feature point feature amounts will be extracted. For this reason, it is determined at step S20 whether all the learning-use input images have been processed.

If it is determined at step S20 that all the learning-use input images have not been processed, control returns to step S15 and the process of step S15 and subsequent processes are repeated. As a result of such a repetition, the matching of the learning-use model image with the plurality of learning-use input images is completed. Meanwhile, if it is determined at step S20 that all the learning-use input images have been processed, control proceeds to step S21.

At step S21, the model dictionary registration processing section 27 calculates the frequency $F(Mi)$ with which each feature point feature amount $Mi$ has been used for recognition as a member of the collection of pairs of corresponding feature points, and extracts feature point feature amounts having high values of this frequency. As to a criterion for selecting the feature point feature amounts, the following methods are conceivable, for example: a method of extracting only feature point feature amounts $Mi$ of which the frequency $F(Mi)$ is equal to or greater than a predetermined threshold value; a method of sorting the feature point feature amounts $Mi$ by the frequency $F(Mi)$ and extracting only top k feature point feature amounts $Mi$; and a method of dividing the frequency $F(Mi)$ by the number of learning-use input images to determine the probability with which each feature point feature amount $Mi$ has been used at the time of recognition, and extracting only feature point feature amounts $Mi$ of which this probability is equal to or greater than a predetermined threshold value. Such a method may be applied as appropriate to the extraction process.

Figure 5:
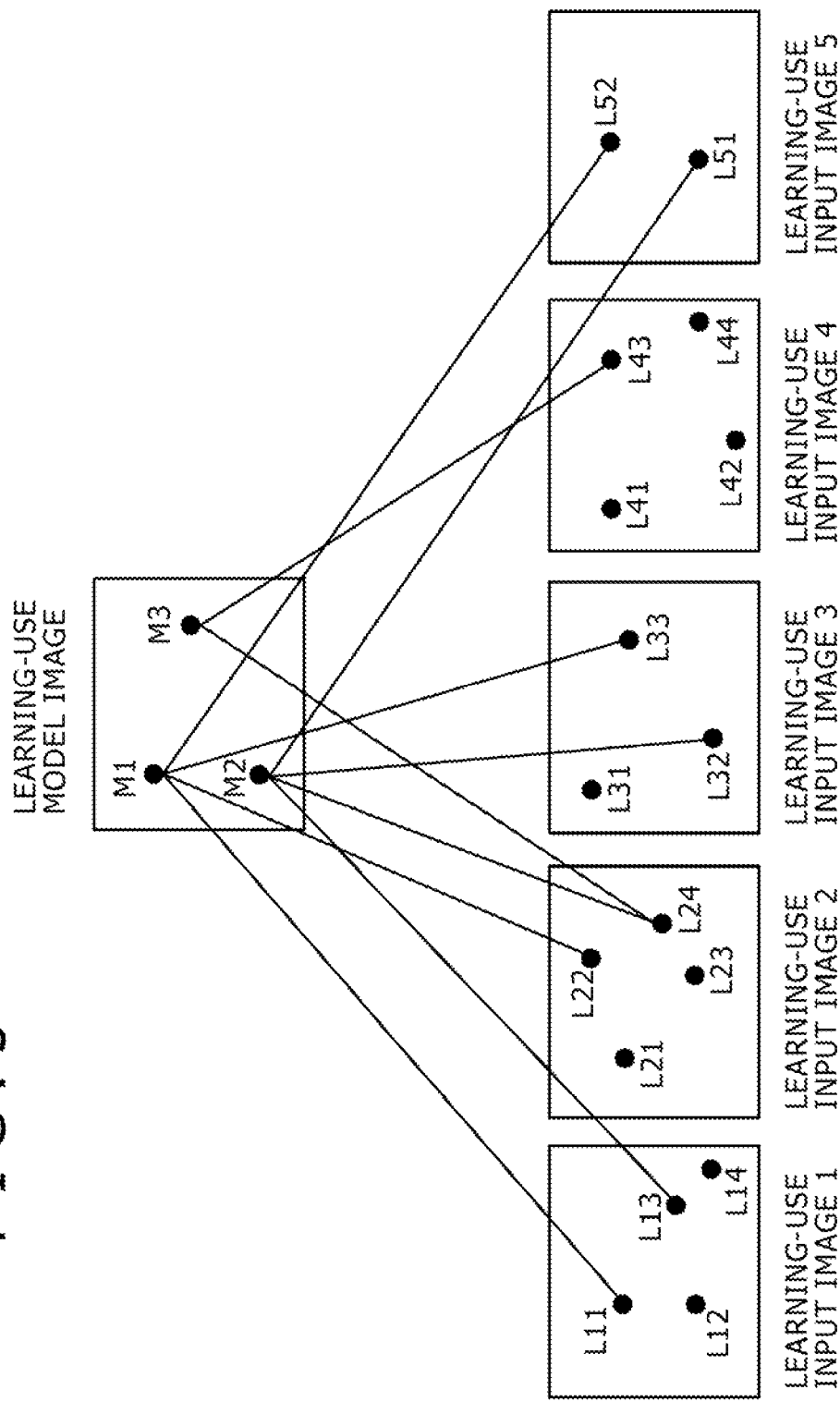
FIG. 5 is a diagram for explaining feature point feature amounts to be extracted.

This extraction will be further described with reference to FIGS. 5 and 6. FIG. 5 illustrates (exemplary) results of matching between the learning-use model image and five learning-use input images. In FIG. 5, a collection of pairs of corresponding feature points obtained as a result of the matching is indicated by lines. For example, a learning-use model feature point feature amount M1 is paired with a feature point feature amount L11 of a learning-use input image 1, a feature point feature amount L22 of a learning-use input image 2, a feature point feature amount L33 of a learning-use input image 3, and a feature point feature amount L52 of a learning-use input image 5.

Similarly, a learning-use model feature point feature amount M2 is paired with a feature point feature amount L13 of the learning-use input image 1, a feature point feature amount L24 of the learning-use input image 2, a feature point feature amount L32 of the learning-use input image 3, and a feature point feature amount L51 of the learning-use input image 5. Further, similarly, a learning-use model feature point feature amount M3 is paired with the feature point feature amount L24 of the learning-use input image 2, and a feature point feature amount L43 of a learning-use input image 4.

The feature amount comparison section 26 (or alternatively, the model dictionary registration processing section 27) manages (temporarily stores) the above, and data as stored is, for example, data as illustrated in FIG. 6. Referring to FIG. 6, it is apparent that the feature point feature amount M1 of the learning-use model image is associated with four feature point feature amounts: the feature point feature amount L11, the feature point feature amount L22, the feature point feature amount L33, and the feature point feature amount L52. That is, this result shows that the frequency $F(Mi)$ of the feature point feature amount M1 is 4: frequency $F(M1)=4$.

Similarly, it is apparent that the frequency $F(Mi)$ of the feature point feature amount M2 is 4 and the frequency $F(Mi)$ of the feature point feature amount M3 is 2: frequency $F(M2)=4$, and frequency $F(M3)=2$. Based on these results, the model dictionary registration processing section 27 extracts (selects) the feature point feature amount M1 and the feature point feature amount M2 at step S21, when extracting the feature point feature amounts having high values of the frequency. Then, as a process of step S22, the model dictionary registration processing section 27 registers the extracted feature point feature amount M1 and feature point feature amount M2 in the model dictionary registration section 12.

In the above-described manner, the learning of the feature point feature amounts is carried out in the learning device 11.

This manner of learning (extracting, selecting) the feature point feature amounts to be registered in the model dictionary registration section 12 achieves learning (extraction, selection) of the feature point feature amounts that contribute greatly to the realization of excellent recognition performance. This allows selective extraction of the feature point feature amounts optimum for recognition without the need for a person to empirically set the parameter (in the above description, for example, the first threshold value and the second threshold value) to be set when extracting the feature point feature amounts.

Note that in the case where a plurality of objects should be recognized by the recognition device 13 described below, the learning device 11 applies the processes of steps S11 to S22 repeatedly with respect to each of the objects, so that feature point feature amounts of all the objects to be recognized are registered in a model dictionary of the model dictionary registration section 12.

That is, although now shown in the flowchart of FIG. 2, when there is the need to process (learn) the plurality of learning-use model images, a determination such as "Learning-use model images of all objects to be learned have been processed?" is performed after the process of step S22, and if NO (i.e., If it is determined that the learning-use model images of all objects to be learned have not been processed), control returns to step S11 and the process of step S11 and subsequent processes are repeated.

A procedure of the recognition device 13 (FIG. 1) that uses the above-described feature point feature amounts to realize excellent recognition performance will now be described below.

[On Procedure of Recognition Device]

Figure 7:
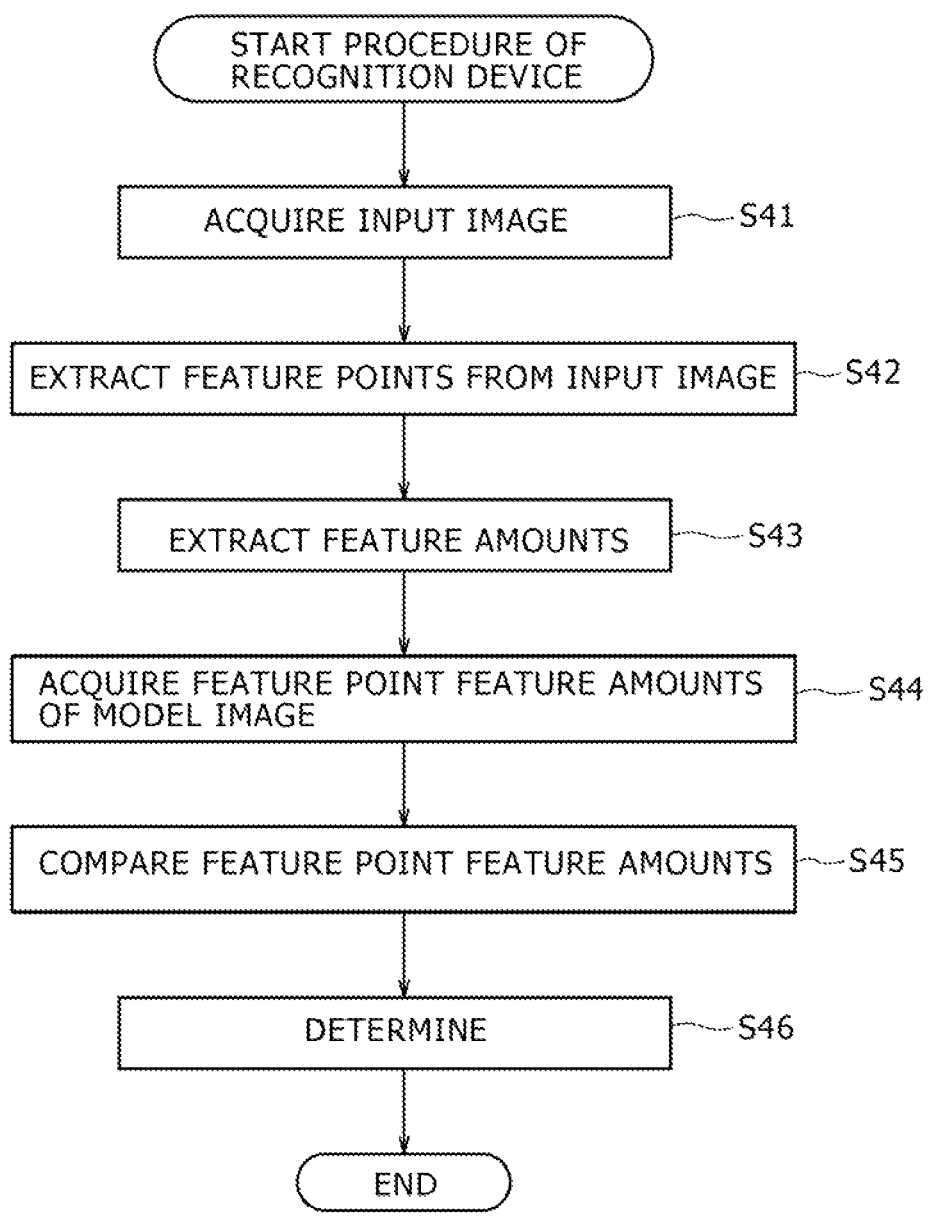
FIG. 7 is a flowchart for explaining an operation of a recognition device.

With reference to a flowchart of FIG. 7, the procedure of the recognition device 13 will now be described below. Note that the recognition device 13 that performs a recognition procedure as described below is mounted on a robot or the like, for example.

At step S41, the feature point extraction section 31 of the recognition device 13 acquires the input image to be processed. At step S42, the feature point extraction section 31 extracts feature points from the acquired input image and supplies the extracted feature points to the feature amount extraction section 32.

At step S43, the feature amount extraction section 32 extracts feature amounts concerning the supplied feature points, and supplies the extracted feature amounts to the feature amount comparison section 33. Processes up to this stage are basically the same as the processes of steps S11 to S13 or steps S15 to S17 described above with reference to the flowchart of FIG. 2, and therefore, detailed descriptions thereof are omitted.

Note that as to a parameter or the like used at the time of the extraction of the feature points or the extraction of the feature amounts, the same value need not be used between the learning device 11 and the recognition device 13, but different values may be used therebetween as appropriate. Also note that there is not limitation that the technique itself related to the extraction thereof must be totally the same between the learning device 11 and the recognition device 13, but different techniques may be used therebetween.

At step S44, the feature amount comparison section 33 acquires the feature point feature amounts of the model image registered in the model dictionary registration section 12. In the case where the model dictionary registration section 12 and the recognition device 13 are connected to each other via the network or the like as described above, the feature point feature amounts are acquired via the network.

At step S45, the feature amount comparison section 33 compares the feature point feature amounts supplied from the feature amount extraction section 32 with the feature point feature amounts acquired from the model dictionary registration section 12. This comparison is performed by basically the same processing as that of step S14 or step S18 in FIG. 2, and therefore, a detailed description thereof is omitted. The process of this comparison is performed with respect to one input image and the plurality of model images (the number of which corresponds to the number of learning-use model images processed in the learning device 11). The plurality of model images (i.e., the feature point feature amounts concerning the model images) may be acquired together at once from the model dictionary registration section 12, or alternatively, they may be acquired separately as necessary. Timing of the acquisition thereof or the like can be determined appropriately in a design stage.

At step S46, the model detection determination section 34 refers to a result of comparison by the feature amount comparison section 33 to detect the model object. For example, the model detection determination section 34 determines a model object of a model image that has the greatest number of pairs of corresponding feature points to be the detected object.

At the time of the above-described comparison of the feature point feature amounts, the feature point feature amounts of the model images registered in the model dictionary registration section 12 are used. These feature point feature amounts as registered are the result of the learning in the learning device 11, and these registered feature point feature amounts are, as described above, those that contribute to improvement in the recognition performance. That is, because the number of registered feature point feature amounts which are acquired (referred to) when the process of comparison is performed is as large as necessary for improving a recognition rate in the recognition process, the improvement in the recognition rate is achieved. Moreover, because only a limited number of feature point feature amounts are registered as described above, reduction in the time required for the process of comparison is achieved.

[On Another Exemplary Structure of Learning Device]

Figure 8:
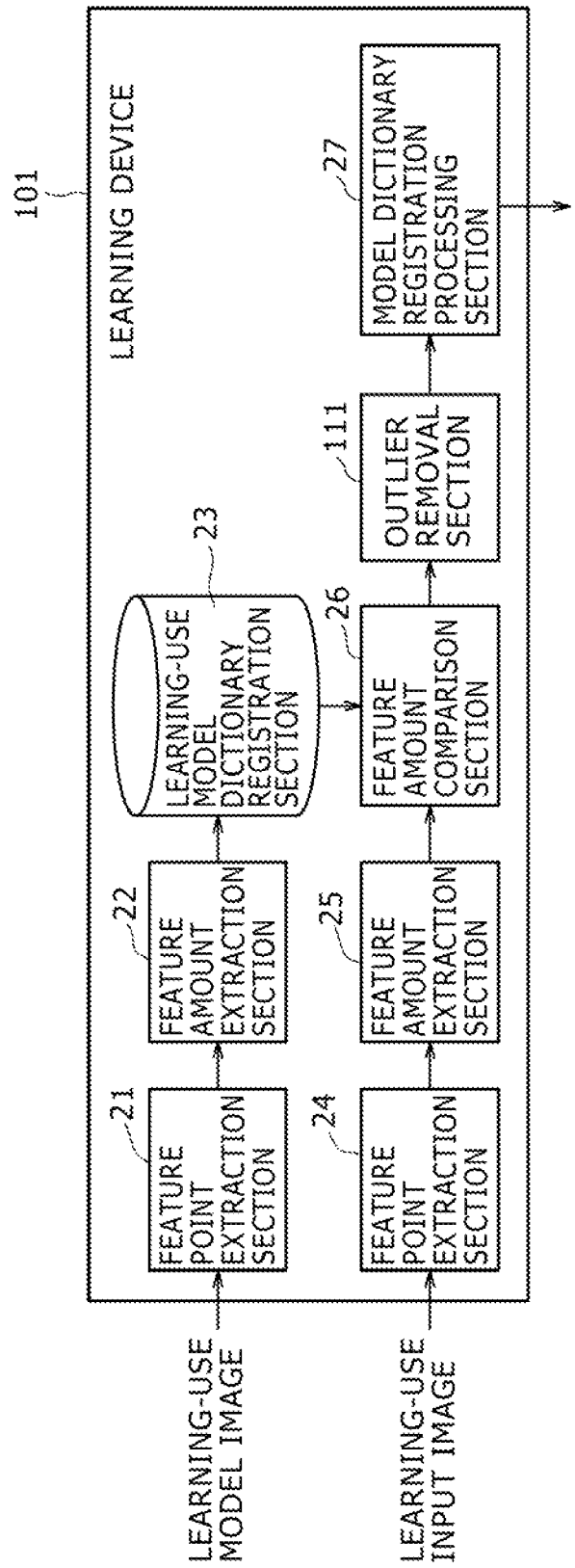
FIG. 8 is a diagram illustrating another exemplary structure of the learning device.

FIG. 8 is a diagram illustrating another exemplary structure of the learning device 11. To compare a learning device 101 as illustrated in FIG. 8 with the learning device 11 as illustrated in FIG. 1, the learning device 101 additionally includes an outlier removal section 111 provided between the feature amount comparison section 26 and the model dictionary registration processing section 27.

That is, the learning device 111 is configured to remove, out of the feature point feature amounts supplied from the feature amount comparison section 26, a feature amount corresponding to an outlier, and output the remaining feature point feature amounts to the model dictionary registration processing section 27. The outlier will now be described below with reference to FIG. 9. The pairs of corresponding feature points are outputted from the feature amount comparison section 26. The pairs of corresponding feature points may include not only a "true pair of feature points (i.e., an inlier)", in which relative spatial positions of the corresponding feature points is not inconsistent with orientation in the learning-use model image, but also a "false pair of feature points (i.e., the outlier)", which involves inconsistency.

Figure 9:
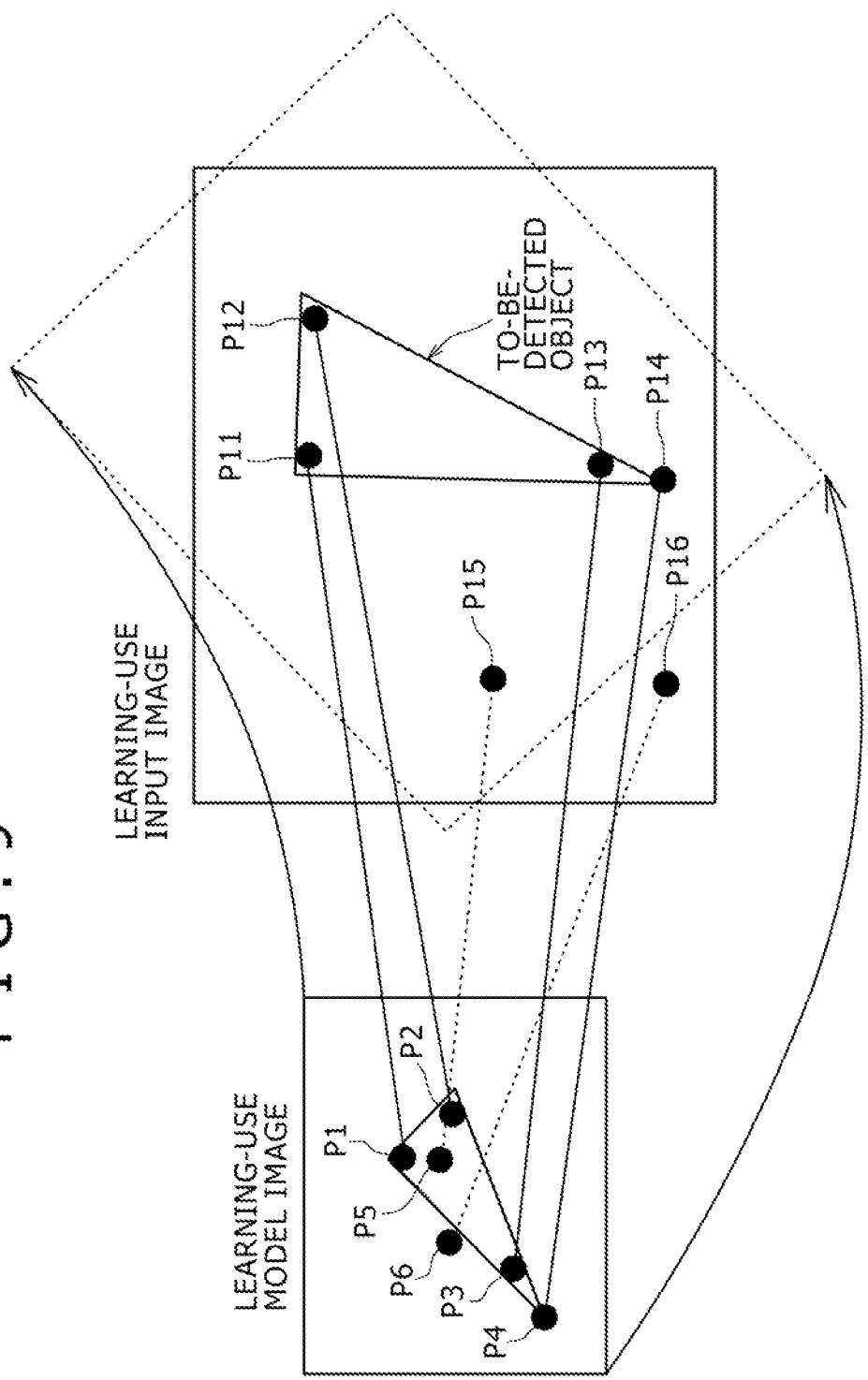
FIG. 9 is a diagram for explaining outliers.

FIG. 9 illustrates the inliers and the outliers schematically. Assuming, as illustrated in FIG. 9, that a triangular learning-use model image on the left-hand side of the figure corresponds to a triangular to-be-detected object (i.e., the model object) in a learning-use input image on the right-hand side of the figure, feature points P1 to P4 in the neighborhood of vertexes of the triangle in the learning-use model image correspond to feature points P11 to P14, respectively, in the to-be-detected object. That is, the feature point P1 corresponds to the feature point P11; the feature point P2 corresponds to the feature point P12; the feature point P3 corresponds to the feature point P13; and the feature point P4 corresponds to the feature point P14. Accordingly, these candidate corresponding feature point pairs form the inliers. Note that in FIG. 9, the inliers are indicated by solid lines.

Meanwhile, a feature point P5 in the learning-use model image is located nearly in the center of an inside of the triangle, while a feature point P6 is located externally and near a perimeter of the triangle. On the other hand, each of a feature point P15 in the learning-use input image which has been paired with the feature point P5 and a feature point P16 in the learning-use input image which has been paired with the feature point P6 is a point at a great distance from the to-be-detected object. That is, a candidate corresponding feature point pair (the feature point P5 and the feature point P15) and a candidate corresponding feature point pair (the feature point P6 and the feature point P16) are the outliers. Note that in FIG. 9, the outliers are indicated by broken lines.

Use of the pairs of corresponding feature points which contain such an outlier results in reduction in precision of the feature point feature amounts registered in the model dictionary registration section 12, which in turn may result in reduction in the recognition performance of the recognition device 13. As such, the learning device 101 may be configured to include the outlier removal section 111 as illustrated in FIG. 8 with addition of a technique for removing the outlier so as to prevent such reduction in the precision and performance.

A procedure in the case where the outlier removal section 111 is provided as in the learning device 101 will now be described below with reference to a flowchart of FIG. 10.

Processes of steps S11 to S118 and processes of steps S120 to S123 are basically the same as those of steps S11 to S18 in FIG. 2 and those of steps S19 to S22 in FIG. 2, respectively, and therefore, detailed descriptions thereof are omitted. That is, the processes performed by the learning device 101, which includes the outlier removal section 111, are basically the same as those performed by the learning device 11, which does not include the outlier removal section 111 except that a process of removing the outlier is performed at step S119.

Needless to say, the processes of steps S120 to S123 are performed with respect to data from which the outline has been removed.

Details of the process for removing the outlier performed at step S119 are disclosed in Japanese Patent Application No. 2004-244018, which has been previously filed by the present applicant, and an invention thereof is applicable.

As described above, according to the present invention, it is possible to select only feature points that are capable of realizing robust recognition in recognition environments that have been assumed when preparing the collection of model learning-use images, and using these feature points (i.e., the feature amounts) for recognition results in improvement in recognition speed and recognition accuracy.

[On Storage Medium]

The above-described series of processes may be implemented in either hardware or software. In this case, the learning device 11 is formed by a personal computer as illustrated in FIG. 11, for example.

In FIG. 11, a CPU (Central Processing Unit) 121 performs various processes in accordance with a program stored in a ROM (Read Only Memory) 122 or a program loaded from a storage section 128 to a RAM (Random Access Memory) 123. In the RAM 123, data necessary when the CPU 121 performs the various processes and the like are also stored as appropriate.

The CPU 121, the ROM 122, and the RAM 123 are connected to one another via a bus 124. An input/output interface 125 is also connected to the bus 124.

To the input/output interface 125 are connected: an input section 126 formed by a keyboard, a mouse, and the like; an output section 127 formed by a display such as a CRT (Cathode Ray Tube), an LCD (Liquid Crystal display), or the like and a loudspeaker or the like; the storage section 128 formed by a hard disk or the like; and a communication section 129 formed by a modem or the like. The communication section 129 performs a communication process via the network such as the Internet or the like.

A drive 130 may also be connected to the input/output interface 125 as necessary, and a removable medium 131 such as a magnetic disk, an optical disk, a magneto-optical disk, a semiconductor memory, or the like is mounted thereon as appropriate. Thus, a computer program read therefrom is installed into the storage section 128 as necessary.

In the case where the series of processes are implemented in the software, a program that forms the software is installed from the network or a storage medium into a computer having a dedicated hardware configuration or, for example, a general-purpose personal computer which, when various programs are installed therein, becomes capable of performing various functions.

As illustrated in FIG. 11, this storage medium may be the removable medium 131, which is delivered, separately from a body of the device, for providing the program to a user and which has the program recorded thereon, such as a magnetic disk (e.g., a floppy disk), an optical disk (e.g., a CD-ROM (Compact Disc-Read Only Memory) or a DVD (Digital Versatile Disk)), a magneto-optical disk (e.g., an MD (Mini-Disk)), or a semiconductor memory. Alternatively, the above storage medium may be the ROM 122, the hard disk included in the storage section 128, or the like, which is originally contained in the body of the device and thus provided to the user and which has the program stored therein.

Note that the steps implemented by the program stored in the storage medium and described in the present specification may naturally be performed chronologically in order of description but do not have to be performed chronologically. Some steps may be performed in parallel or independently.

Also note that the term "system" as used in the present specification refers to a system as a whole composed of a plurality of devices.

The invention claimed is:

1. An image processing system, comprising:
   a computer processor that includes:
      a first feature point extraction section for extracting first feature points from a first image;
      a first feature amount extraction section for extracting first feature amounts from the first feature points extracted by said first feature point extraction section;
      a first registration section for registering the first feature amounts extracted by said first feature amount extraction section;
      a second feature point extraction section for extracting second feature points from a second image;
      a second feature amount extraction section for extracting second feature amounts from the second feature points extracted by said second feature point extraction section;
      a generation section for comparing the first feature amounts registered by said first registration section with the second feature amounts extracted by said second feature amount extraction section to generate candidate corresponding feature point pairs as pairs of feature points that have similar feature amounts;
      a selection section for selecting, from the first feature amounts, registration-use feature amounts to be registered, based on a frequency with which each of the first feature amounts is included in the candidate corresponding feature point pairs generated by said generation section, wherein the selection section divides the frequency by a total number of first images to determine a probability associated with each first feature amount and selects first feature amounts with the probability equal to or greater than a predetermined threshold;
      a second registration section for registering the registration-use feature amounts selected by said selection section;
      a third feature point extraction section for extracting third feature points from a third image;
      a third feature amount extraction section for extracting third feature amounts from the third feature points extracted by said third feature point extraction section; and
      a detection section for comparing the registration-use feature amounts registered by said second registration section with the third feature amounts extracted by said third feature amount extraction section to detect a model object contained in the third image.

2. A learning device, comprising:
   a computer processor that includes:
      a first feature point extraction section for extracting first feature points from a first image;
      a first feature amount extraction section for extracting first feature amounts from the first feature points extracted by said first feature point extraction section;
      a first registration section for registering the first feature amounts extracted by said first feature amount extraction section;
      a second feature point extraction section for extracting second feature points from a second image;

a second feature amount extraction section for extracting second feature amounts from the second feature points extracted by said second feature point extraction section;

a generation section for comparing the first feature amounts registered by said first registration section with the second feature amounts extracted by said second feature amount extraction section to generate candidate corresponding feature point pairs as pairs of feature points that have similar feature amounts; and a selection section for selecting, from the first feature amounts, a registration-use feature amount to be registered, based on a frequency with which each of the first feature amounts is included in the candidate corresponding feature point pairs generated by said generation section, wherein the selection section divides the frequency by a total number of first images to determine a probability associated with each first feature amount and selects first feature amounts with the probability equal to or greater than a predetermined threshold.

3. The learning device according to claim 2, wherein the second image contains a model mage contained in the first image without fail.

4. The learning device according to claim 2, wherein a parameter used when said first feature point extraction section and said first feature point extraction section perform the extraction is set at a void value.

5. The learning device according to claim 2, wherein the second image is an image generated by subjecting a specified image to digital processing.

6. The learning device according to claim 5, wherein the digital processing is one of scale transformation, rotational transformation, similarity transformation, affine transformation, projection transformation, noise addition, brightness change, sharpness change, and blur addition, or any combination of these image transforms.

7. A learning method, comprising:
extracting, by a computer processor, first feature points from a first image;
extracting, by the computer processor, first feature amounts from the first feature points;
registering, by the computer processor, first feature amounts;
extracting, by the computer processor, second feature points from a second image;
extracting, by the computer processor, second feature amounts from the second feature points;
comparing, by the computer processor, the first feature amounts that have been registered with the second feature amounts that have been extracted to generate candidate corresponding feature point pairs as pairs of feature points that have similar feature amounts; and
selecting, by the computer processor, from the first feature amounts, a registration-use feature amount to be registered, based on a frequency with which each of the first feature amounts is included in the candidate corresponding feature point pairs, wherein the selecting comprises dividing the frequency by a total number of first images to determine a probability associated with each first feature amount and selecting first feature amounts with the probability equal to or greater than a predetermined threshold.

8. A non-transitory computer-readable medium encoded with a computer program, which when executed by a computer, causes the computer to perform a method comprising:
extracting first feature points from a first image;
extracting first feature amounts from the first feature points;
registering first feature amounts;
extracting second feature points from a second image;
extracting second feature amounts from the second feature points;
comparing the first feature amounts that have been registered with the second feature amounts that have been extracted to generate candidate corresponding feature point pairs as pairs of feature points that have similar feature amounts; and
selecting, from the first feature amounts, a registration-use feature amount to be registered, based on a frequency with which each of the first feature amounts is included in the candidate corresponding feature point pairs, wherein the selecting comprises dividing the frequency by a total number of first images to determine a probability associated with each first feature amount and selecting all first feature amounts each with the probability equal to or greater than a predetermined threshold.

* * * * *